United States Patent [19]

Kawabata

[11] 4,416,523

[45] Nov. 22, 1983

[54] AUTOMATIC FOCUSING SYSTEM

[75] Inventor: Takashi Kawabata, Kamakura, Japan

[73] Assignee: Canon Kabushiki Kaisha, Tokyo, Japan

[21] Appl. No.: 380,438

[22] Filed: May 20, 1982

[30] Foreign Application Priority Data

May 28, 1981 [JP] Japan .................................. 56-81336
May 29, 1981 [JP] Japan .................................. 56-82668

[51] Int. Cl.³ .............................................. G03B 3/10
[52] U.S. Cl. .................................................. 354/25
[58] Field of Search ........................... 354/25; 250/204

[56] References Cited

U.S. PATENT DOCUMENTS 3,571,598  3/1971  Lombard, Jr. ...................... 250/204
3,836,919  9/1974  Matsumoto et al. .................. 354/25

Primary Examiner—Michael L. Gellner
Attorney, Agent, or Firm—Fitzpatrick, Cella, Harper & Scinto

[57] ABSTRACT

A system for automatically adjusting the focus of lens is provided with an auxiliary arrangement for forcibly shifting the lens to a predetermined position when the focus detection by a focus detecting system is either difficult or impossible with the lens being at its initial position and causing the focus detecting system to effect focus detection under the new shifted condition of the lens.

17 Claims, 5 Drawing Figures

AUTOMATIC FOCUSING SYSTEM

BACKGROUND OF THE INVENTION

1. Field of the Invention

This invention relates to an automatic focusing system, and particularly to a counter-measure when focus detection is difficult or impossible.

2. Description of the Prior Art

The automatic focusing system, irrespective of the TTL (Through The Lens) type or the non-TTL type, has a focus detection capable range of predetermined magnitude. That is, for example, in the case of a camera, the picture-taking lens thereof generally has a focus adjustable range of the order of 0.5 m or 1 m to the order of 10 m or 15 m (such object distances generally correspond to "infinity"), but in contrast, the ordinary focus detecting system can only take, as the object of focus detection, for example, several meters before and after 5 m to which the picture-taking lens is focused, and accordingly, where the object to be photographed lies outside the focus detection capable range, the focus detection with respect to such object is very difficult or entirely impossible.

This tendency is salient particularly in long-focus lenses or macro lenses and, above all, in single lens reflex cameras using the TTL type system, it offers a great problem. That is, for example, in single lens reflex cameras, more severe focusing accuracy is required while, on the other hand, where the focus detecting system is of a so-called image sharpness detection type or contrast detection type, the magnitude of the focus detection capable range becomes smaller and smaller and accordingly, the problem as noted above is feared more strongly.

SUMMARY OF THE INVENTION

The present invention has been made in view of the above-described situation and a primary object thereof is to provide a novel automatic focusing system provided with improvements for a more effective counter-measure for a case where the focus detection by focus detecting means is difficult or impossible with lens means being at its initial position.

Another object of the present invention is to provide an automatic focusing system provided with auxiliary means which is very useful when use must be made of focus detecting means having a focus detection capable range small as compared with the distance adjustable range of less means, namely, auxiliary means which is effective to overcome the inconvenience which may result from the fact that the focus detection capable range of the focus detecting means is small.

Under such objects, according to the present invention, there is proposed an automatic focusing system provided with auxiliary means for forcible shifting lens means to a predetermined position when the focus detection by the focus detecting means is either difficult or impossible with the lens means being at its initial position and causing the focus detecting means to effect focus detection under the new shifted condition of the lens means.

In a preferred first embodiment of the present invention, the long-focus position is selected as the predetermined position to which the lens means is forcibly shifted, because generally, the focus detecting means, irrespective of the type thereof, tends to reduce its capability on the long distance side. With this point taken into account, the present invention seeks after a more rational form of the system. Further describing the first embodiment, the lens means, when it arrives at the limit of the long-focus position side, namely, the infinit-focus position, is now driven to the shortest-focus position and in the meantime, focus detection is effected. Where focus detection is still impossible with the lens means having arrived at the limit point of the shortest-focus position side, the lens means is again driven toward the infinite-focus position and finally stopped at the infinit-focus position. In contrast, in a second embodiment of the present invention, where a plurality of predetermined positions are set up, the lens means is first shifted to the focus position on the shortest distance side and, if focus detection is impossible even there, the lens means is shifted to the focus position on the long distance side and, if focus detection is still impossible at the focus position on the longest distance side (for example, the infinite-focus position), the lens means is stopped at that position or another predetermined position. Where focus detection is impossible at whatever position the lens means may be, it is generally preferable that the lens means be stopped at the infinite-focus position and in this point, the focus searching system seen in the second embodiment is rational. Accordingly, from such a point of view, it may be rational even in the first embodiment to first shift the lens means to the shortest-focus position side, and then shift the lens means to the infinite-focus position and, where focus detection is finally impossible, to stop the lens means at the infinite-focus position, and there is no harm in doing so.

Other objects and features of the present invention will become apparent from the following detailed description taken in conjunction with the accompanying drawings.

DESCRIPTION OF THE PREFERRED EMBODIMENTS

Figure 1:
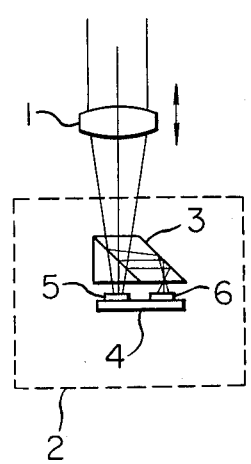
FIG. 1 is a schematic view schematically showing the optical arrangement and construction of focus detecting means in an automatic focusing system to which the improvements of the present invention are applicable.

Referring first to FIG. 1, reference numeral 1 designates a focus adjustable lens (a picture-taking lens in a camera), and reference numeral 2 denotes a focus detecting sensor unit. The lens 1 is movable along the optical axis thereof and, for example, in case of a single lens reflex camera, it forms an object image on the focusing glass through a movable mirror, not shown. The sensor unit 2 is disposed at a position conjugate with the film surface, for example, at the bottom of the mirror box of the camera, and is set so as to create, through a beam dividing prism 3, the images at the planes before and after the predetermined focal plane (film surface) on two conversion elements 5 and 6 disposed in a photoelectric converter 4, the conversion elements being capable of responding to any variation in the image sharpness.

Figure 2:
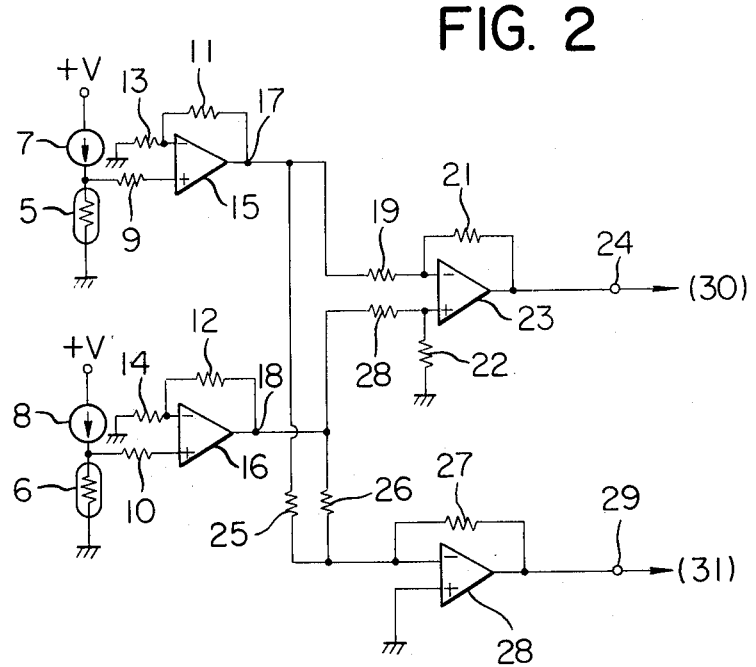
FIG. 2 is a partial circuit diagram showing an example of the focus detecting circuit applied to the construction shown in FIG. 1.

The photoelectric conversion elements 5 and 6 disposed as shown in FIG. 1 are supplied with constant currents from constant current sources 7 and 8 as shown in FIG. 2, so that voltages corresponding to the levels of the sharpness of the images at the planes before and after the predetermined focal plane (film surface) are produced across their terminals, respectively. These voltages are applied through input resistors 9 and 10 to operational amplifiers 15 and 16, respectively, and produce amplified sharpness signals at the output ends 17 and 18 thereof. Reference numerals 11 and 12 designate feedback resistors, and reference numerals 13 and 14 denote voltage dividing resistors. These signals are applied to a subtracting amplifier 23 and an adding amplifier 28, where subtraction and addition are effected, and a signal corresponding to the difference between the levels of the sharpness of the images at the points before and after the predetermined focal plane and a signal corresponding to the sum of levels of the sharpness are produced at the output terminals 24 and 29 of the amplifiers 23 and 28, respectively.

Figure 3:
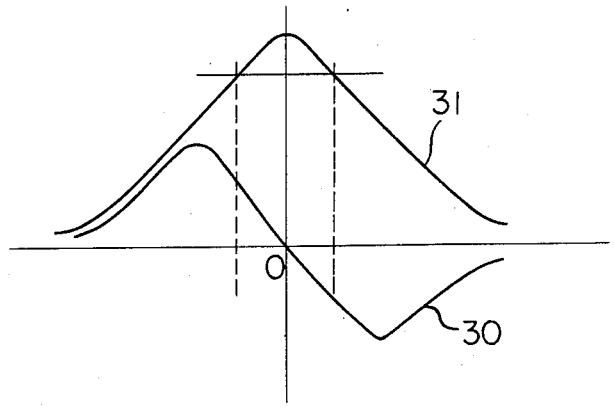
FIG. 3 is an output waveform graph showing the variations in the two outputs of the FIG. 2 circuit corresponding to the focus adjustment.

FIG. 3 is a graph in which the "difference signal" and the "sum signal" are depicted with respect to the deviation (defocus) of the imaging position of the lens relative to the predetermined focal plane. In FIG. 3, the abscissa represents the amount of defocus and the ordinate represents the levels of the signals. Curve 30 corresponds to the difference signal and curve 31 corresponds to the sum signal. As shown, the difference signal 30 becomes zero at the in-focus point (the position O) and, under the out-of-focus, it assumes a positive or negative level, so that the curve becomes S-shaped. The sum signal 31 assumes a maximum level at the in-focus point and, under the out-of-focus, it becomes a mountain shape approximating to zero. The system is so set that it becomes operable when the signal 31 has a level not less than a predetermined value and a distance adjusting mechanism for the lens is servo-driven to such a position that the difference signal 30 becomes zero, whereby automatic focusing is performed.

It is known that even in the case of the focus detection signal using the so-called image deviation system which differs from the above-described focus detecting means using the sharpness, the maximum degree of image correlation is obtained by the signal curve such as 31 of FIG. 3 and that the then degree of deviation is obtained by the signal curve such as 30.

Figure 4:
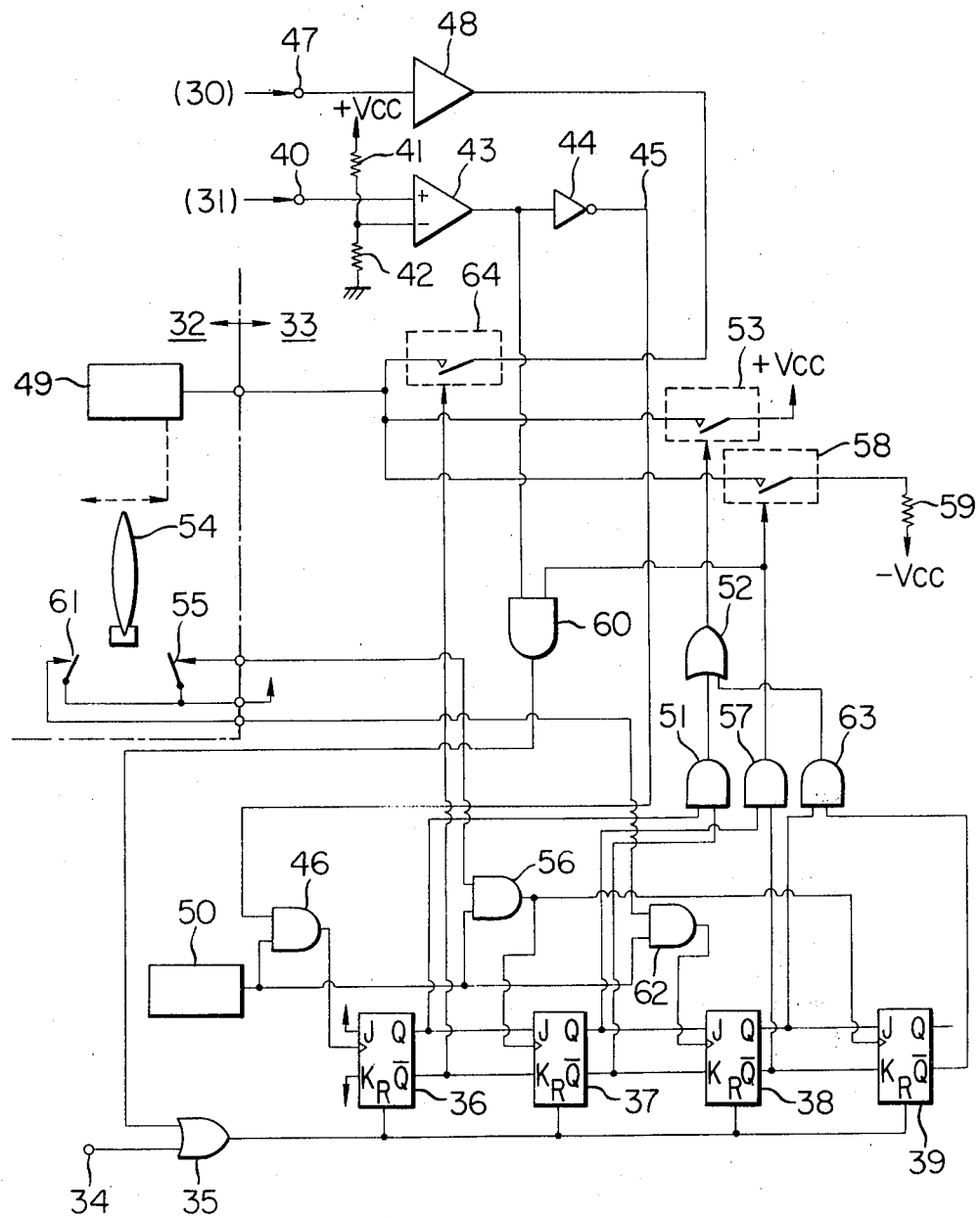
FIG. 4 is a block diagram showing a first embodiment in which the improvements of the present invention are applied to an automatic focusing system provided with the focus detecting means shown in FIGS. 1 and 2.

Reference is now had to FIG. 4 to describe a first embodiment of the automatic focusing system according to the present invention. In FIG. 4, reference numeral 32 at the left upper portion designates the lens device side and reference numeral 33 at the right-hand side denotes the camera body side.

First, when a terminal 34 is rendered into high level (hereinafter simply referred to as "H") by a conventional method, not shown, JK flip-flops (hereinafter simply referred to as FF) 36–39 are reset through an OR gate 35.

In this condition, the sum signal 31 (FIG. 3) from the terminal 29 of FIG. 2 is applied to a terminal 40, whereby the reference level by voltage dividing resistors 41, 42 and the level of this sum signal 31 are compared with each other by a comparator 43 and if the level of the sum signal 31 is sufficiently high to ensure focus detection, the output of the comparator 43 becomes "H" and a terminal 45 is rendered into a low level (hereinafter simply referred to as "L") through an inverter 44 to open an AND gate 46 and inhibit the application of a clock to FF 36. By this, the advance of the sequence of FF 36 is stopped, and the $\overline{Q}$ terminal of FF 36 becomes "H" and closes a switch 64. Thus, when the difference signal 30 (FIG. 3) from the terminal 24 of FIG. 2 is applied to a terminal 47, it is amplified by an amplifier 48 and applied to a motor 49 on the lens device side 32 through a switch 64 to rotate the motor in forward or reverse direction and move a lens 54 into its in-focus state.

When the level of the sum signal 31 is too low to ensure a sufficient focus detection output, the output of the comparator 43 becomes "L" and the terminal 45 becomes "H". Thus, the output of an oscillator 50 is applied as a clock to FF 36 through the AND gate 46. In FF 36, the J terminal becomes "H", the K terminal becomes "L", the Q terminal becomes "H" and the $\overline{Q}$ terminal becomes "L".

At this time, FF 37 remains reset and therefore, the $\overline{Q}$ terminal of FF 37 becomes "H" and an AND gate 51 becomes "H" and a switch 53 is closed through an OR gate 52.

Also, the $\overline{Q}$ terminal of FF 36 becomes "L" and a switch 64 is OFF, so that the motor 49 drives the level 54 at a high speed toward the infinite-focus position by the driving current from the switch 53. When the lens 54 arrives at the infinite-focus position, a switch 55 on the lens device side 32 is closed, whereby the output of the oscillator 50 is imparted to FF 37 through an AND gate 56, so that in FF 37, the Q output becomes "H" and the $\overline{Q}$ output becomes "L". Thus, the output of the AND gate 51 becomes "L" and the movement of the lens is stopped at the infinite-focus position. At this time, FF 38 still remains reset and therefore, the Q output of FF 37 becomes "H" and the $\overline{Q}$ output of FF 38 becomes "H" and the output of an AND gate 57 becomes "H" to close a switch 58, so that the motor 49 now starts to drive the lens 54 at a relatively low speed from the infinite-focus position toward the shortest-focus position by the power supply through a resistor 59. If a sufficient focus detection signal is obtained during this scanning from the infinit-focus position, the output of the comparator 43 becomes "H" and the output of an AND gate 60 becomes "H" and FF 36-39 are reset through the OR gate 35, whereupon the system shifts to the ordinary auto-focus operation previously described.

Where a sufficient focus detection signal is not obtained even if scanning is made to the shortest-focus position by the above-described operation, a switch 61 on the lens device side 32 is closed, whereby the output of the oscillator 50 is applied as a clock to FF 38 through an AND gate 62 to render the Q output of FF 38 into "H" and the $\overline{Q}$ output of FF 38 into "L". By this, the output of an AND gate 57 becomes "L" to open a switch 58 and thereby stop said scanning. At this time, FF 39 remains reset and therefore, the output of an AND gate 63 is rendered into "H" and the switch 53 is closed through the OR gate 52, and the high-speed driving of the lens to the infinite-focus position is effected by the motor 49 as previously described. When the lens 54 arrives at the infinite-focus position, the switch 55 is closed as previously described and the output of the oscillator 50 is applied to FF 39 through the AND gate 56 to render the $\overline{Q}$ output of FF 39 into "L" and stop the movement of the lens 54 at the infinite-focus position. Thus, where the focus position is not determined even by the aforementioned search scanning, the lens 54 can be brought into focus on the infinity which is generally faultless.

The switches 55 and 61 at the end of the stroke of the lens in the above-described embodiment may be optical switches instead of mechanical switches and can more easily prevent the overrunning of the lens when they use the rising or falling of the pulse than when they use the AND (56, 62) with the oscillator output.

Also, where the focus is not detected even if the search scanning is effected, the lens may be moved to focus, rather than for the "infinity," for the most frequently used distance. This may be ensured simply by providing an additional switch.

Also, if a potentiometer instead of the switch is used to provide the minimum range and the infinity, for example, at the points of 5% and 95%, the detection on the camera side is possible by the same comparator irrespective of the lens interchange and, if the most frequently used distance is at 80%, for example, it is also possible to focus the lens for the most frequently used distance only by one comparator.

Although the elements 53, 58 and 64 have been simply described as switches, of course these are so-called analog gates such as FET swtiches.

Figure 5:
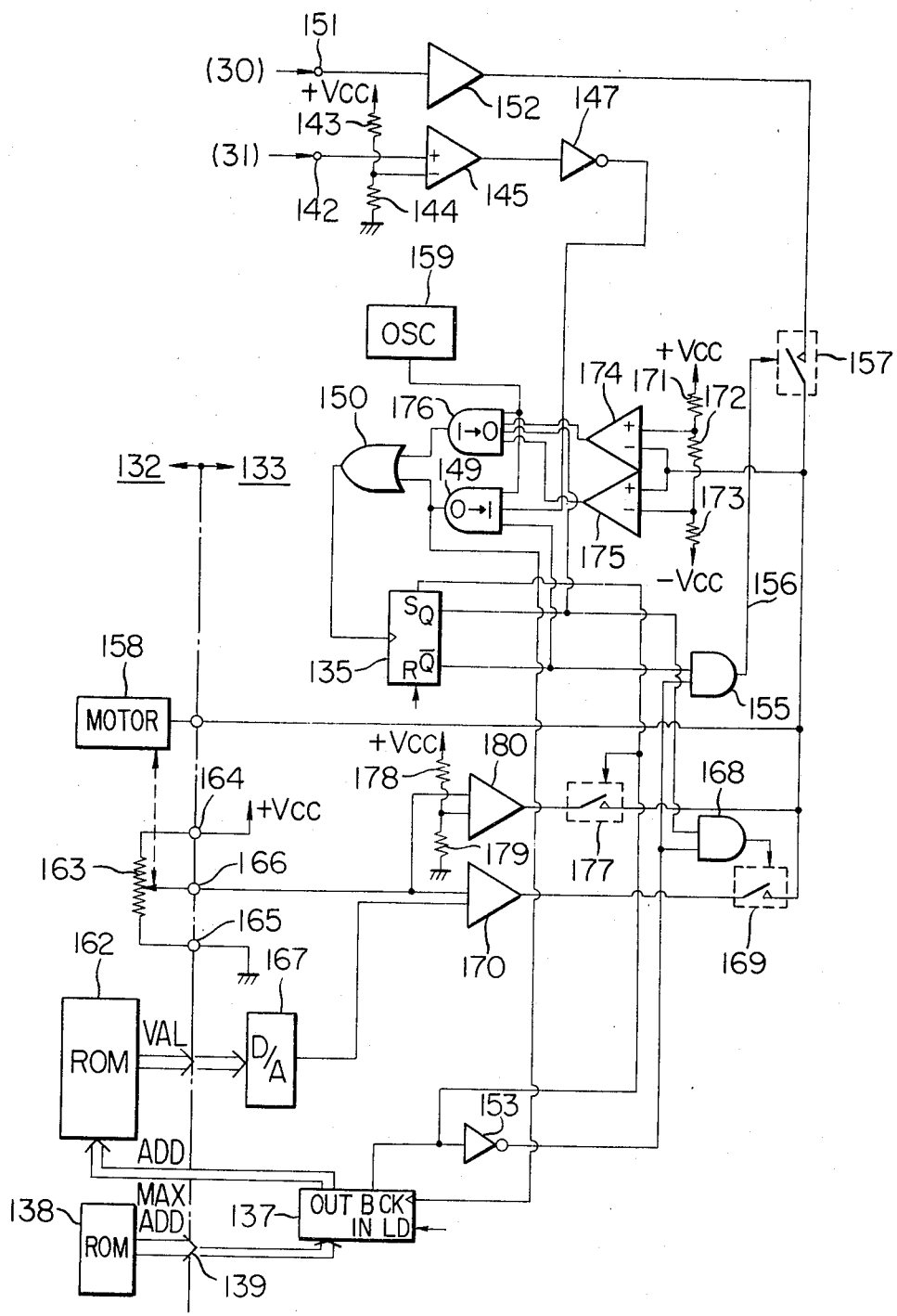
FIG. 5 is a block diagram showing a second embodiment of the present invention.

Reference is now had to FIG. 5 to describe a second embodiment of the automatic focusing system according to the present invention. In FIG. 5, the left portion 132 is the lens device side and the right portion 133 is the camera body side. At the start of automatic focusing, the reset terminal R of T-type RS flip-flop 135 is rendered into "H" to reset FF 135 and the load terminal LD of a presettable counter 137 is rendered into "H" and the maximum address +1 of the lens, for example, the signal of "5", stored in a ROM 138 on the lens device side 132 is loaded into the counter 137 from the ROM 138 on the lens device side 132 through a contact 139. By this, the Q output of RSFF 35 becomes "L" and the $\overline{Q}$ output thereof becomes "H". If, at this time, i.e., at the initial lens position, focus detection is sufficiently possible, that is, if the level of the sum signal 31 from the terminal 29 of FIG. 2 is sufficiently high, the output representing the result of the comparison between the sum signal 31 imparted to a terminal 142 and the reference voltage by resistors 143 and 144 effected by a comparator 145 becomes "H" and this is logic-inverted by an inverter 147 to render the output thereof into "L" and render the output of an AND gate 149 into "L", whereby inversion of FF 135 through an OR gate 150 is inhibited and the device shifts to the ordinary auto-focus mode. That is, the difference signal 30 from the terminal 24 of FIG. 2 is imparted to a terminal 151 and amplified by an amplifier 152 to thereby effect auto-focus. That is, as previously described, the counter 137 remains loaded and therefore, the Borrow terminal B thereof is at "L". This is logic-inverted by an inverter 153 and the output thereof is rendered into "H", and by this "H" signal and the "H" of the $\overline{Q}$ output of FF 135, the output 156 thereof is rendered into "H" through an AND gate 155 to close a switch 157. Thus, by the output of the amplifier 152, a lens motor 158 is driven to move the lens, thereby effecting auto-focus.

Next, if a sufficient focus detection signal is not obtained at the initial lens position, the output of the comparator 145 becomes "L" and the output of the inverter 147 becomes "H". The signal from an oscillator 159, with the $\overline{Q}$ output of FF 135, is applied as input to an AND gate 149 and a clock is put out through the gate 149. By this, a clock is imparted to the clock input of the counter 137 to cause the counter 137 to effect down count and an address, for example, "4", is put out at the output thereof. Thus, a designated lens position signal for the shortest distance search, for example, a signal of 3 m, is put out by a ROM 162 on the lens device side 132. This signal forcibly moves the lens to an in-focus position relative, for example, to a distance 3 m, and a causes the voltage of a voltage dividing output terminal 166, for example, a voltage corresponding to 2 V for 3 m, to be produced by a voltage imparted to the opposite ends 164 and 165 of a lens adjusted position detecting potentiometer 163 operatively associated with the lens. The relation of this voltage to the lens position corresponds to the input signal of a D/A converter 167 and accordingly, to the signal of the output voltage.

Now, on the other hand, FF 135 is inverted by the clock from the AND gate 149 through an OR gate 150 to render the Q output of FF 135 into "H" and the $\overline{Q}$ output thereof into "L". By this, the output of an AND gate 168, with the "H" of the output of the inverter 153, is rendered into "H" to close a switch 169. Thus, a motor 158 is controlled by the output of a differential amplifier 170 which receives the output from the D/A converter 167 which D/A-converts the designated lens position signal from the ROM 162 on the lens device side 132 and the output from the terminal 166 of the lens adjusted position detecting potentiometer 163 on the lens device 132 side, so that the lens is forcibly moved to a position designated by the output from ROM 162, for example, to a distance of 3 mm. The termination of this movement is detected by the fact that the motor driving voltage becomes zero by voltage dividing resistors 171, 172, 173 and window comparators 174, 175. By the "H" of the then outputs of the comparators 174, 175 and the "H" of the then Q output of FF 135, the clock from the oscillator 159 is put out through an AND gate 176, and this is imparted to FF 135 through an OR gate 150 to invert FF 135, whereupon the device shifts to a mode for checking whether focus detection is possible.

That is, whether servo AF is possible, for example, at the 3 m position, is checked by the "L" of the Q output of FF 135 and the "H" of the $\overline{Q}$ output thereof on the basis of the output of the comparator 145 and, if focus detection is possible, the motor 158 is controlled by the output of the amplifier 152 to effect the ordinary auto-focus.

On the other hand, if a sufficient focus detection signal is not obtained even at this position, the counter 137 is caused to effect down count as previously described and the lens is shifted to the next designated lens position for search, for example, a longer distance (5 m), whereby focus detection is again tried. When a sufficient focus detection signal is not obtained even at all designated lens positions for search from the short distance to the long distance, FF 135 is set by the "H" of the Borrow signal of the counter 137 to fix the mode, and the outputs of AND gates 155 and 168 are both rendered into "L" by the "L" of the output of the inverter 153 to open a conventional auto-focus switch 157 and a search switch 169 and close a switch 177, and the motor 158 is controlled by the output of a differential amplifier 180 which receives the fixed position signal by resistors 178, 179 and the output signal of the potentiometer 163, whereby the lens is moved to the most frequently used focusing position or the infinite-focus position and fixed thereat.

The lens adjusted position signal and the designated lens position signal for search in the above-described embodiment may be either analog or digital and, if the switches 169 and 177 are not closed, such searching action is not carried out by the reset terminal R of FF 135 being rendered into "H" and thus, the device acts as the ordinary auto-focus. In a case where auto-focus is abandoned, if the switch 177 is opened, the lens will be stopped at the final search position and it will also be possible to designate the abandonment position from ROM 162 by the address of the counter 137 during the Borrow thereof. It is also easy to limit the search range by a switch or the like.

As described above, by designating the lens position for search, the search trial can be changed, in accordance with the lens, for example, to the distance 5 m for a wide angle, the distances 5 m, ∞, 1 m for a standard, and the distances 10 m, ∞, 5 m, 20 m, 30 m, . . . , for a telephoto, and thus, automatic focusing can be accomplished more quickly and accurately.

Although the elements 157, 169 and 177 have been simply described as switches, these, like the elements 53, 58 and 64 of FIG. 4, are analog gates such as FET switches.

What I claim is:

1. An automatic focusing system including:
   (A) focus adjustable lens means;
   (B) focus detecting means for detecting the focus adjusted state of said lens means and producing an output indicative of the focus adjusted state of said lens means;
   (C) adjust means for adjusting the focus of said lens means on the basis of the output of said focus detecting means;
   (D) discriminating means for discriminating whether the focus detection by said focus detecting means is sufficiently possible at a position whereat said lens means is currently placed, said discriminating means producing a characteristic output when the focus detection by said focus detecting means is not sufficiently possible; and
   (E) shift means for forcibly shifting said lens means to a predetermined position in response to the characteristic output of said discriminating means, said shift means having a control circuit for shifting said lens means to another position when the characteristic output is still being produced by said discriminating means with said lens means forcibly shifted to said predetermined position.

2. The system according to claim 1, wherein said shift means is capable of acting on said adjust means to thereby forcibly shift said lens means to said predetermined position.

3. The system according to claim 1 or 2, wherein said predetermined position is a predetermined long-focus position.

4. The system according to claim 3, wherein said control circuit, with said lens means once shifted to said predetermined long-focus position, continues to shift said lens means to a predetermined short-focus position as long as the characteristic output is produced by said discriminating means.

5. The system according to claim 4, wherein said control circuit stops said lens means at a predetermined stop position when the characteristic output is still being produced by said discriminating means with said lens means having arrived at said predetermined short-focus position.

6. The system according to claim 5, wherein said predetermined stop position is coincident with said predetermined long-focus position.

7. The system according to claim 6, wherein said control circuit has means for detecting the arrival of said lens means at said predetermined long-focus position and the arrival of said lens means at said predetermined short-focus position.

8. The system according to claim 1 or 2, wherein said predetermined position is a predetermined short-focus position.

9. The system according to claim 8, wherein said control circuit, with said lens means once shifted to said predetermined short-focus position, continues to shift said lens means to a predetermined long-focus position as long as the characteristic output is produced by said discriminating means.

10. The system according to claim 9, wherein said control circuit stops said lens means at a predetermined stop position when the characteristic output is still being produced by said discriminating means with said lens means having arrived at said predetermined long-focus position.

11. The system according to claim 10, wherein said predetermined stop position is coincident with said predetermined long-focus position.

12. The system according to claim 11, wherein said control circuit has means for detecting the arrival of said lens means at said predetermined short-focus position and the arrival of said lens means at said predetermined long-focus position.

13. The system according to claim 10, wherein said predetermined stop position is the most frequently used focusing position.

14. The system according to claim 13, wherein said control circuit has means for detecting the arrival of said lens means at said predetermined short-focus position, the arrival of said lens means at said predetermined long-focus position and the arrival of said lens means at said predetermined stop position.

15. The system according to claim 9, wherein said control circuit provides predetermined distinctive positions for the control of the position said lens means.

16. The system according to claim 1 or 2, wherein said control circuit provides continuous positions for the control of the position of said lens means.

17. The system according to claim 1 or 2, wherein said control circuit provides predetermined distinctive positions for the control of the position of said lens means.

* * * * *

UNITED STATES PATENT AND TRADEMARK OFFICE
CERTIFICATE OF CORRECTION

PATENT NO. : 4,416,523
DATED : November 22, 1983
INVENTOR(S) : TAKASHI KAWABATA

It is certified that error appears in the above-identified patent and that said Letters Patent is hereby corrected as shown below:

Column 2, line 4, "infinit" should read --infinite--;
         line 10, "infinit" (second occurrence) should read --infinite--.

Column 4, line 46, "infinit" should read --infinite--.

Column 5, line 28, "swtiches" should read --switches--.

Column 6, line 11, delete "a" (second occurrence);
         line 34, "3mm." should read --3m.--.

Column 8, line 53, Claim 15, --of-- should be inserted after "position".

Signed and Sealed this

Twenty-fourth Day of April 1984

[SEAL]

Attest:

GERALD J. MOSSINGHOFF

Attesting Officer    Commissioner of Patents and Trademarks